United States Patent [19]

Faria et al.

[11] 3,940,347

[45] Feb. 24, 1976

[54] CALCIUM TUNGSTATE X-RAY PHOSPHORS AND METHOD FOR PREPARING SAME

[75] Inventors: Sixdeniel Faria, Towanda; Lyle K. Williams, Wysox, both of Pa.

[73] Assignee: GTE Sylvania Incorporated, Stamford, Conn.

[22] Filed: Aug. 30, 1973

[21] Appl. No.: 393,141

Related U.S. Application Data

[63] Continuation-in-part of Ser. No. 264,760, June 21, 1972, abandoned.

[52] U.S. Cl. ............................................. 252/301.5
[51] Int. Cl.² ......................................... C09K 11/40
[58] Field of Search ................................ 252/301.5

[56] References Cited
UNITED STATES PATENTS

| | | | |
|---|---|---|---|
| 1,602,593 | 10/1926 | Sheppard | 252/301.5 |
| 3,668,143 | 6/1972 | Luckey | 252/301.5 |

*Primary Examiner*—Jack Cooper
*Attorney, Agent, or Firm*—Norman J. O'Malley; Donald R. Castle; William H. McNeill

[57] ABSTRACT

A calcium tungstate X-ray phosphor is disclosed which consists essentially of a calcium tungstate host and from about 50 to about 200 parts per million, based upon the weight of the host, of vanadium as a dopant. The disclosed phosphor exhibits no detectable lag or persistence and is appreciably brighter than prior X-ray phosphors. A process for producing the phosphor is also disclosed which process comprises forming an aqueous reaction media of a water-soluble calcium source and a water-soluble tungstate source having an excess of calcium, maintaining a temperature of above about 80°C for a time sufficient to form solid calcium tungstate having a stoichiometric excess of calcium, separating the solid calcium tungstate, adding from about 50 to 200 ppm of a vanadium source and a fluxing material, heating said calcium tungstate to a temperature of between about 700°C and 1150°C for a sufficient time to form a phosphor composition and washing the phosphor with sufficient water to remove any residual water soluble contaminants. An optional process is to add, in addition to the vanadium source, from about 0.05% to about 1.0%, based upon the weight of the host, of tungsten trioxide.

6 Claims, No Drawings

CALCIUM TUNGSTATE X-RAY PHOSPHORS AND METHOD FOR PREPARING SAME

CROSS REFERENCE TO RELATED APPLICATION

This application is a continuation-in-part of Ser. No. 264,760, filed June 21, 1972, now abandoned and assigned to the assignee of the present invention. Assignment recorded on June 21, 1972, Reel 2868, Frame 379.

BACKGROUND OF THE INVENTION

1. Field of the Invention

This invention relates to calcium tungstate phosphors suitable for X-ray usage and to processes for preparing same.

2. Prior Art

Calcium tungstate $CaWO_4$, is a phosphor material that luminesces efficiently under X-ray excitation. Such phosphor materials are embedded in a binder and manufactured into a screen. The screen is used to intensify the image produced on a photographic film in X-ray machines. Brightness is an important factor in minimizing the patient's exposure to X-rays.

Several methods for preparing $CaWO_4$ are known. The fusion or solid state methods involve heating together at elevated temperature a calcium source and a tungstate source. Typical methods include heating a calcium compound such as calcium carbonate and tungsten trioxide. In such reactions, carbon dioxide is evolved. Another solid state process is to heat a calcium halide such as calcium chloride with a tungstate salt such as sodium tungstate.

In U.S. Pat. No. 1,602,593, issued Oct. 12, 1926, lag is stated to be reduced by adding vanadium salts at the 0.2 to 0.5 percent vanadate by weight of the calcium tungstate produced by solid state techniques. Complete elimination of lag is stated to be not achieved. In more recent years, purity of phosphor raw materials and of the phosphors have been improved and generally addition of other materials above about 500 ppm are avoided.

Chemical precipitation method is a known method for preparing calcium tungstate. In this method, an aqueous solution of a water-soluble calcium compound such as calcium chloride and a water-soluble tungstate salt such as sodium tungstate is formed. Calcium tungstate precipitates from the aqueous solution and can be separated. The $CaWO_4$ phosphors so produced, while brighter than the solid state reaction products, have had an objectionable persistence or lag.

It is believed, therefore, that a calcium tungstate X-ray phosphor composition which exhibits no detectable persistence and exhibits increased brightness is an advancement in the art. An additional advancement in the art is the capability of certain embodiments to achieve brightness considerably in excess of the prior art phosphors.

OBJECTS AND SUMMARY OF THE INVENTION

It is an object of this invention to provide calcium tungstate X-ray phosphor composition which exhibits no detectable persistence.

It is a further object of this invention to provide a calcium tungstate X-ray phosphor composition having an excess of calcium which exhibits no detectable persistence and has an increased brightness.

It is an additional object of this invention to provide a process for the production of calcium tungstate X-ray phosphors having improved properties.

It is another object of this invention to enable a calcium tungstate phosphor having a deficiency of tungstate to be improved over prior art similar phosphors which had an atomic ratio of Ca/W of essentially 1.

These and additional objects and advancements in the art are achieved by one aspect of the invention by a calcium tungstate X-ray phosphor consisting essentially of a host of calcium tungstate and from about 50 to about 200 parts per million by weight based upon the host of vanadium as a dopant which phosphor exhibits no detectable persistence.

In an additional aspect of this invention, the remaining objects as well as other objects and advancements in the art are achieved by the process for producing the phosphors. The process comprises reacting under controlled conditions, an excess of a specified calcium source and a specific tungstate source to form a calcium tungstate precipitate having a Ca/W ratio greater than 1, separating the calcium tungstate, incorporating from 50 to 200 ppm of a vanadium source and a fluxing agent into the precipitate and heating the mixture at about 1300°F to about 2100°F for a sufficient time to form a X-ray phosphor and washing the phosphor to remove any residual flux.

DESCRIPTION OF THE PREFERRED EMBODIMENTS

For a better understanding of the present invention, together with other and further objects, advantages and capabilities thereof, reference is made to the following disclosure and appended claims in connection with the above description of some of the aspects of the invention.

Persistence or lag is an important characteristic of the phosphors used in X-ray intensifying screens. The ideal X-ray phosphor is one which luminesces with bright intensity during exposure and immediately ceases emission after the exposure to X-ray ceases. The phosphors of this invention, thus, provide a brighter emitting phosphor and expose the photographic film as desired without over-exposure since immediately upon the cessation of the X-ray excitation there is no further emission of light.

Brightness of emission is an important characteristic. The solid state reaction products as disclosed in U.S. Pat. No. 1,602,593 only have about 60% of the brightness of the phosphors of this invention. If the vanadium is added in the amounts as disclosed on that patent, the brightness is lowered even further as further illustrated in Example 6. Such low brightness levels would result in excessive exposure time in order to obtain a usable X-ray.

In the present invention, the calcium tungstate is formed via a chemical reaction by adding an excess of a water soluble calcium source to a water soluble tungstate source and heating for a time sufficient for a $CaWO_4$ to form which has a Ca/W ratio greater than 1. Normally a precipitate is formed by maintaining the temperature above about 80°C for at least 60 minutes. It is believed as a result, some vacancies occur in the lattice of the precipitate due to a stoichiometric imbalance at the time the precipitate, $CaWO_4$ is formed. These vacancies are filled by undesirable atoms, e.g., the alkali metals which result in the undesirable lag and lower the brightness of the phosphor. As previously mentioned, these vacancies can be filled by the addition of $WO_3$ to the precipitate and by adding a source of vanadium such as potassium vanadate. The $WO_3$ and vanadium can be added together or separately in any order. If added separately, it is preferred to incorporate each into the matrix by a separate heating step. The $WO_3$ reacts with any calcium or alkali metal present to form either more calcium tungstate or a water-soluble alkali metal tungstate which is removed in the subsequent water washing step. Vanadium is added and completely eliminates the persistence without any loss in brightness. Generally from about 0.05% to about 1% of tungsten trioxide based upon the weight of the host is added. Any excess $WO_3$ is also removed by washing with a solution of an alkali metal hydroxide to form a water-soluble tungstate which is removed. Preferably, the $CaWO_4$ phosphors are prepared by the addition of $WO_3$ and vanadium to achieve both a brightness increase and the elimination of persistence.

The phosphors of this invention consist essentially of a host of calcium tungstate and as a dopant from about 50 to about 200 ppm of vanadium and exhibit no lag as measured by Federal Specification for X-ray Intensifying Screens GG-S-00176b, Section 4.4.5 as revised on Feb. 28, 1967. If less than 50 ppm of vanadium based on the weight of the host is added, the persistence is not eliminated. More than 200 ppm adds no benefits and reduces the brightness of the phosphor. With large amounts of vanadium in the order of 0.2% or greater, the phosphor becomes unsuitable for X-ray purposes because in order to obtain satisfactory X-rays, the exposure time becomes higher than allowed by good medical techniques. From about 50 ppm to abut 100 ppm of vanadium is preferred.

To more fully illustrate the subject invention, the following detailed examples are presented. All parts, proportions and percentages are by weight unless otherwise indicated.

EXAMPLE 1

Reagent or purified $CaCl_2$ and $Na_2WO_4$ are each dissolved in water at a ratio of 1.3 moles $CaCl_2$ to 1.0 mole $Na_2WO_4$. Both solutions are heated to 80°C and then the $CaCl_2$ solution is added to the $Na_2WO_4$ at a rate of about 100 ml/minute with agitation. The precipitated $CaWO_4$ is digested for about 60 minutes and then allowed to settle. The filtrate is decanted and the precipitate is washed with hot water several times until free of excess chloride ions.

EXAMPLE 2

200 parts of the $CaWO_4$ precipitate, prepared in Example 1, is blended with 5% $WO_3$ and prefired at 700°C for 1 hour. This material is slightly ground and about 10% KCl and 0.02% V as $KVO_3$ is added to it and again refired at 800°C for 64 hours in covered quartz or alumina crucibles. After washing, silica coating, drying, and screening the following X-ray brightness was obtained at 80 KV excitation:

| | |
|---|---|
| Known Commercial Standard (Control) | 100% |
| Test | 104% |

The standard is produced by the solid state technique with no persistence.

EXAMPLE 3

About 200 parts of $CaWO_4$ plus KCl and V is first fired at 1050°C for three hours. To this material 0.5% $WO_3$ and additional amounts of KCl and V as in Example 2 is added and the blend is fired at 950°C for about two hours. Analytical test results are:

| Sample No. | | X-ray Brightness |
|---|---|---|
| 1 | Control | 100% |
| 2 | $WO_3$ Added (No persistence) | 120% |

EXAMPLE 4

A series of phosphors prepared as in Example 3 is tested for persistence.

Table 1

Effect of V on the Persistence of $CaWO_4$

| | PPM V | Persistence |
|---|---|---|
| Control | 0 | strong |
| Test A | 10 | medium |
| Test B | 20 | medium |
| Test C | 40 | faint |
| Test D | 80 | none |
| Test E | 160 | none |

Measurement of Persistence — This evaluation of persistence is carried out as outlined under Federal Specifications for X-ray Intensifying Screens-GG-S-00176b — revised Feb. 28, 1967. Section 4.4.5 reads as follows:

"A suitable cassette shall be loaded with the screens under test but without a film. Prior to test, screens shall be rested for 24 hours. The temperature of the screens during the test shall be 77°±2°F. Several metal coins or other roentgenopaque test objects shall be placed on the front of the cassette and exposed for one minute at radiation of 100KVP, 5ma, and 20-inch target-to-screen distance. The cassette shall then be taken to the darkroom and exactly 30 seconds after the termination of the roentgen exposure, the cassette shall be opened and an unexposed piece of Type III, Class B film (L-F-310) shall be quickly inserted between the screens and the cassette shall be closed. After remaining in the closed cassette for 10 minutes, the film shall be removed and processed according to L-F-310, washed and dried. Examine the film for evidence of shadows of the test objects."

EXAMPLE 5

Precipitated as in Example 1

1000 parts of $CaWO_4$, 0.2 parts of V as $KVO_3$, 50 parts of $WO_3$ and 100 parts KCl are fired at 1130°C for 16 hours. The phosphor showed no persistence and a brightness (or speed) of 110% of a known $CaWO_4$ phosphor standard.

EXAMPLE 6

Three samples of calcium tungstate are prepared by firing calcium chloride and sodium tungstate in molar equivalent amounts. The materials were fired at 1900°F for about two hours. In Sample A, no ammonium vanadate was added. In Sample B, about 0.2% by weight of ammonium vanadate based upon the weight of the calcium tungstate produced was added. In Sample C, 0.5% by weight of ammonium vanadate was added based upon the calcium tungstate produced. After firing, the brightness of the three samples was tested using a control as based on the previous examples. Sample A contained a strong lag as measured by the persistence specification previously given and a brightness of 60% of the control. Sample B had no lag, but a brightness of only 30%. Sample C had a brightness of 20% and no lag. The results of the foregoing indicates that the brightness is effectively reduced by using a solid state method and that by adding the amount of ammonium vanadate necessary to reduce the lag, the brightness is reduced to such a degree as to make the phosphor unusable as an X-ray phosphor.

EXAMPLE 7

About 1000 parts of calcium tungstate, precipitated as in Example 1, is blended with 10% by weight of potassium chloride and 0.02% vanadium as potassium vanadate. After blending thoroughly the materials are fired at 1100°C for about 16 hours in a covered crucible. After firing, the material is washed free of chloride, is coated with silica, filtered, dried and screened through a 400 mesh screen. The material thereafter is dried and refired at 800°C for about 4 hours with the addition of 2% by weight of potassium chloride. Thereafter, the phosphor is washed and coated with silica and dried. The material has a particle size of about 10 to 12 microns and is free flowing and has a bulk density of between about 40 and 50 grams per cubic inch. The brightness of the phosphor as tested against a control as in the previous example, is over 100% of the control which is a commercially available calcium tungstate. Smaller particle size material can be produced and if desired, the initial firing time is reduced to about 3 hours. In such an instance, an average particle size of between about 8 and 10 microns is obtained.

While there has been shown and described what are at present considered the preferred embodiments of the invention, it will be obvious to those skilled in the art that various changes and modifications may be made therein without departing from the scope of the invention as defined by the appended claims.

What is claimed is:

1. A calcium tungstate X-ray phosphor composition consisting essentially of a calcium tungstate host and from about 50 to about 200 parts per million, based upon the weight of calcium tungstate host, of vanadium as a dopant, said composition exhibiting no detectable persistence.

2. A phosphor composition according to claim 1 wherein said vanadium is from about 50 ppm to about 100 ppm based on the weight of said host.

3. A process for producing a calcium tungstate phosphor suitable for x-ray intensifying screens, said process comprises
    a. forming an aqueous reaction media consisting essentially of water-soluble calcium source and a water-soluble tungstate source, said calcium to tungsten ratio being greater than 1 in said solution
    b. maintaining a temperature in said solution above about 80°C for at least 60 minutes to form a solid calcium tungstate precipitate having a Ca/W ratio of greater than 1,
    c. separating the solid calcium tungstate,
    d. adding from about 50 to about 200 ppm of a vanadium source and a fluxing material of potassium chloride,
    e. heating said calcium tungstate to a temperature between about 700°C and 1150°C for a time sufficient to form a phosphor composition, and
    f. washing said composition with water to remove any residual water-soluble contaminants.

4. A process according to claim 3 wherein after said separation of said calcium tungstate and before said heating step, an amount of $WO_3$ is added to said calcium tungstate to achieve a Ca/W ratio less than 1.

5. A process according to claim 4 wherein said amount of $WO_3$ is from about 0.05% to about 1%, based upon the weight of said calcium tungstate.

6. A process according to claim 4, wherein said vanadium and said tungsten trioxide are added in any order and each is incorporated by heating from about 700°C to about 1150°C.

* * * * *